(12) United States Patent
Suzuki (10) Patent No.: US 11,743,407 B2
(45) Date of Patent: Aug. 29, 2023

(54) LIGHT-EMITTING DEVICE AND IMAGE FORMING APPARATUS

(71) Applicant: CANON KABUSHIKI KAISHA, Tokyo (JP)

(72) Inventor: Tatsuya Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/714,359

(22) Filed: Apr. 6, 2022

(65) Prior Publication Data

US 2022/0329707 A1 Oct. 13, 2022

(30) Foreign Application Priority Data

Apr. 12, 2021 (JP) ................................ 2021-067243

(51) Int. Cl.
*H04N 1/028* (2006.01)
*H04N 1/00* (2006.01)
*G03G 15/04* (2006.01)

(52) U.S. Cl.
CPC ... *H04N 1/02885* (2013.01); *G03G 15/04054* (2013.01); *H04N 1/00907* (2013.01); *H04N 1/0288* (2013.01)

(58) Field of Classification Search
CPC .......... G03G 15/04054; H04L 12/6418; H04L 5/0007; H04N 1/00907; H04N 1/0288; H04N 1/02885; H04W 72/12; H04W 72/1215; H04W 72/51; H04W 88/02; H04W 88/06; H04W 88/08; Y02B 20/30; Y02E 20/30

USPC ......................................................... 358/482
See application file for complete search history.

(56) References Cited

U.S. PATENT DOCUMENTS

| | | | |
|---|---|---|---|
| 9,248,445 B2 | 2/2016 | Okamoto | |
| 9,362,896 B2 | 6/2016 | Suzuki | |
| 11,199,788 B1* | 12/2021 | Ueda | G03G 15/04054 |
| 11,385,561 B2 | 7/2022 | Suzuki | |
| 2008/0079669 A1* | 4/2008 | Jo | H04N 1/40031 |
| | | | 345/76 |
| 2016/0321990 A1* | 11/2016 | Kim | G09G 3/3233 |
| 2020/0203863 A1 | 6/2020 | Suzuki | |
| 2021/0072661 A1* | 3/2021 | Suzuki | G03G 15/043 |
| 2022/0091533 A1* | 3/2022 | Yagi | H04N 1/00798 |
| 2022/0128922 A1* | 4/2022 | Yagi | G03G 15/04036 |

(Continued)

FOREIGN PATENT DOCUMENTS

| | | |
|---|---|---|
| JP | 2006-130663 A | 5/2006 |
| JP | 2017-94499 A | 6/2017 |

*Primary Examiner* — Negussie Worku
(74) *Attorney, Agent, or Firm* — Venable LLP (57) ABSTRACT

A plurality of groups are arranged in a light emitting device. Each of the groups includes a plurality of light-emitting elements, a plurality of transistors arranged corresponding to the plurality of light-emitting elements and configured to supply current to the plurality of light-emitting elements, and a group control transistor configured to control current flowing through the plurality of transistors. The plurality of groups have a first group and a second group. The first group has a plurality of light-emitting elements. The second group has a plurality of light-emitting elements. A light-emitting element of the second group is arranged between one light-emitting element of the first group and the other light-emitting element of the first group.

10 Claims, 10 Drawing Sheets

(56) References Cited

U.S. PATENT DOCUMENTS

2022/0203705 A1* 6/2022 Tanimoto .................. B41J 2/447
2022/0329707 A1* 10/2022 Suzuki ............. G03G 15/04054
2022/0404732 A1* 12/2022 Tanimoto ................... B41J 2/45

* cited by examiner

LIGHT-EMITTING DEVICE AND IMAGE FORMING APPARATUS

BACKGROUND OF THE INVENTION

Field of the Invention

The present invention relates to a light-emitting device and an image forming apparatus.

Description of the Related Art

Development of an optical writing device (e.g., OLED-PH: Organic Light Emitting Diode Print Head) used in an image forming apparatus including an organic light-emitting element (e.g., OLED: Organic Light Emitting Diode) as a light-emitting source has progressed. Since in the OLED-PH, the OLED and a thin film transistor (TFT) can be formed on the same substrate, the OLED-PH is advantageous in downsizing and lowering a cost. The OLED is a light-emitting element of a current driving type. In the OLED-PH, a large number of the OLEDs receive supply of current through a power source line that is a common power source line. Thus, a current value for driving the OLED is affected by wiring resistance of the power source line that supplies current. Accordingly, there is a concern that variation in light emission quantity among the plurality of OLEDs occurs, and image quality decreases.

Japanese Patent Laid-Open No. 2017-094499 (hereinafter PTL 1) discloses technology in which a plurality of contact points are arranged on a power source line that supplies drive current to a light-emitting element, and a reference potential is supplied from any one of the contact points to a DAC in accordance with a lighting state of each of the light-emitting elements, and accordingly, fluctuation in light quantity is suppressed. In addition, Japanese Patent Laid-Open No. 2006-130663 (hereinafter PTL 2) discloses technology in which voltage of a cathode driver is controlled, and thus a light quantity difference is corrected for light quantity of a light-emitting element line and for each of rows of the light-emitting element lines, and light quantity unevenness is suppressed.

According to the technology disclosed in PTL 1 and PTL 2, a circuit for adjusting light quantity with respect to the light-emitting element and wiring of the light-emitting element is added to suppress influence of light quantity unevenness. Thus, circuit scale may increase and chip size may also increase.

SUMMARY OF THE INVENTION

The present invention has been made in view of the problems described above, and can provide a light-emitting device that provides reduced influence of light quantity unevenness.

According to an aspect of the present invention, a light-emitting device of the present invention is a light-emitting device in which a plurality of groups are arranged, each of the groups comprising a plurality of light-emitting elements, a plurality of transistors arranged corresponding to the plurality of light-emitting elements, respectively and configured to supply current to the plurality of light-emitting elements, respectively; and a group control transistor configured to control current flowing through the plurality of transistors, wherein the plurality of groups comprise a first group and a second group, the first group comprises a first group control transistor, a plurality of transistors of the first group through which a first current amount flowing through the first group control transistor flows, and a plurality of light-emitting elements, the second group comprises a second group control transistor, a plurality of transistors of the second group through which a second current amount flowing through the second group control transistor flows, and a plurality of light-emitting elements, and a light-emitting element of the second group is arranged between one light-emitting element of the first group and the other light-emitting element of the first group.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An organic light-emitting element (e.g., OLED: Organic Light Emitting Diode) will be explained below as an example of a light-emitting element. Note that the present disclosure is not limited to an OLED, and can be applied generally to a light-emitting device of a current driving type.

Embodiments

Figure 1:
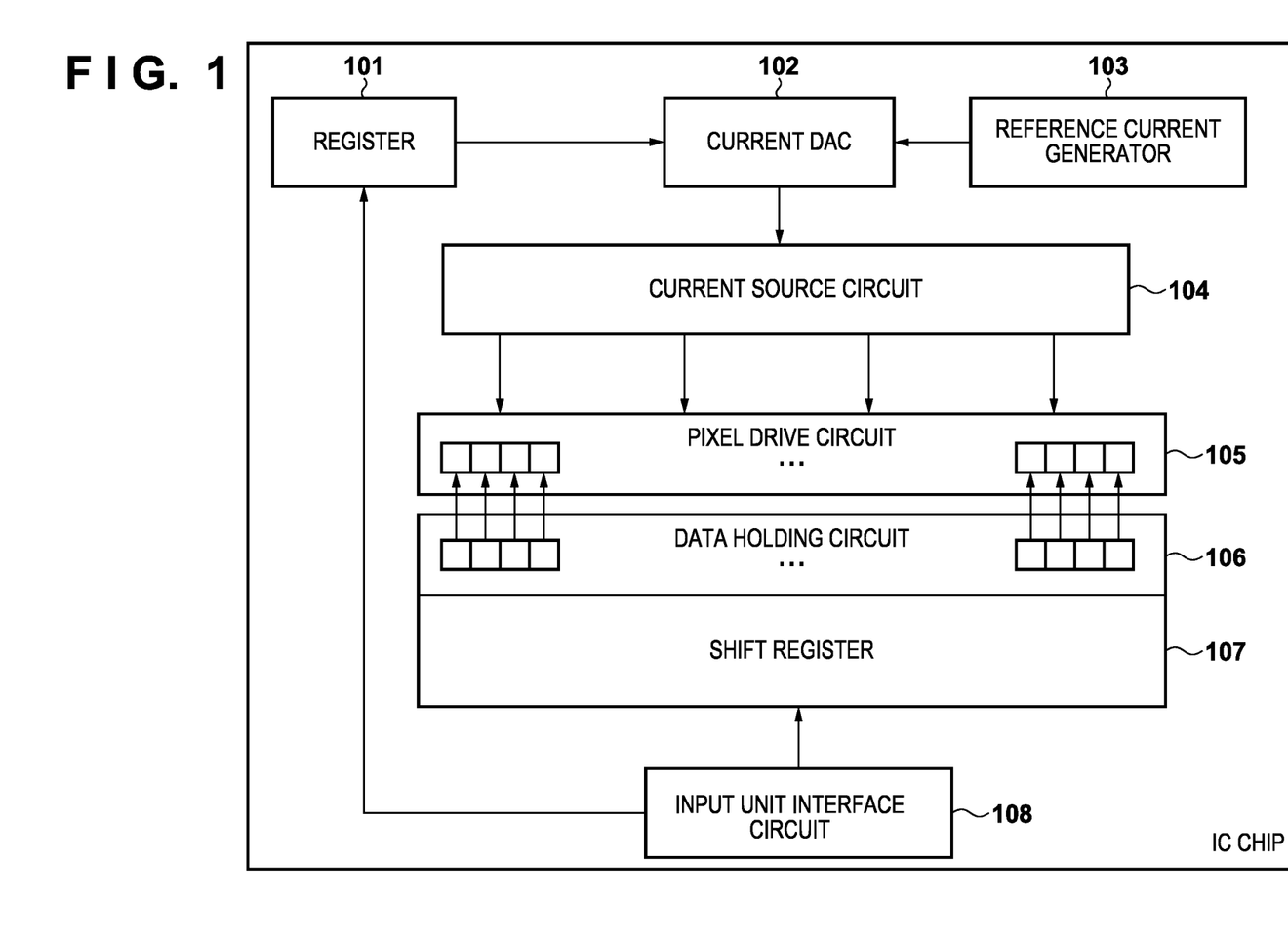
FIG. 1 illustrates an example of a block diagram of a light-emitting device chip.

FIG. 1 illustrates an example of a circuit block diagram of a light-emitting device formed as an integrated circuit, according to the present embodiment. The light-emitting device is provided with a register 101, a current digital-to-analog converter (DAC) 102, a reference current generator 103, a current source circuit 104, and a pixel drive circuit 105 including an OLED. In addition, the light-emitting device is further provided with a data holding circuit 106, a shift register 107, and an input unit interface circuit 108. The input unit interface circuit 108 functions as an interface that receives mode information for accessing a power source or a register from an external interface and information regarding image data and that outputs a data signal to the register 101 and the shift register 107.

The reference current generator 103 generates reference current for driving, by a reference current source arranged inside the reference current generator 103, and supplies the reference current to the DAC 102. The DAC 102 determines drive current of the OLED from drive current output from the register 101 and the reference current for driving generated by the reference current generator 103, and outputs an analog value according to a digital value to the current source circuit 104. The current source circuit 104 supplies drive current of a pixel and bias voltage to the pixel drive circuit 105.

Based upon the data signal of the input unit interface circuit 108, the shift register 107 controls light emission and non-light emission timing of the OLED. The data holding circuit 106 holds information corresponding to each of OLEDs, and determines light emission and non-light emission of the OLED. The pixel drive circuit 105 including the OLED drives the OLED and causes the OLED to emit light by the drive current and the bias voltage that are supplied from the current source circuit 104 and by a signal supplied from the data holding circuit 106. Details of light emission will be described below.

In an OLED-PH, a plurality of light-emitting devices each of which an OLED is installed in and which are formed as an integrated circuit are arrayed in a line shape. According to the light-emitting devices each of which the OLED is installed in, even when light quantity of light emission is set by equal adjustment target light quantity, a circuit constant changes for each of the light-emitting devices due to variation in a manufacturing process, and light quantity of light emission varies. For instance, when image formation is performed in a state where light quantity of light emission is different by approximately 10% among the light-emitting devices, a density difference in an image among the light-emitting devices is visually perceivable from a change in exposure area.

Thus, in an inspection process in a factory, a difference between the adjustment target light quantity and light quantity of the light-emitting device in which the OLED is installed is detected. Then, based upon a light quantity difference that is detected, a drive current adjustment value at which light quantity of an adjustment target value is obtained is stored in an initial adjustment value storage unit (not illustrated) arranged in the OLED-PH. Information on the drive current adjustment value that is stored and that corresponds to the light-emitting device is input to the input unit interface circuit 108, and is set in the register 101, and determines drive current of the OLED of the light-emitting device by the DAC 102 as described above. In this manner, light quantity control is performed, and light quantity variation adjustment of the individual light-emitting device is performed.

Figure 2:
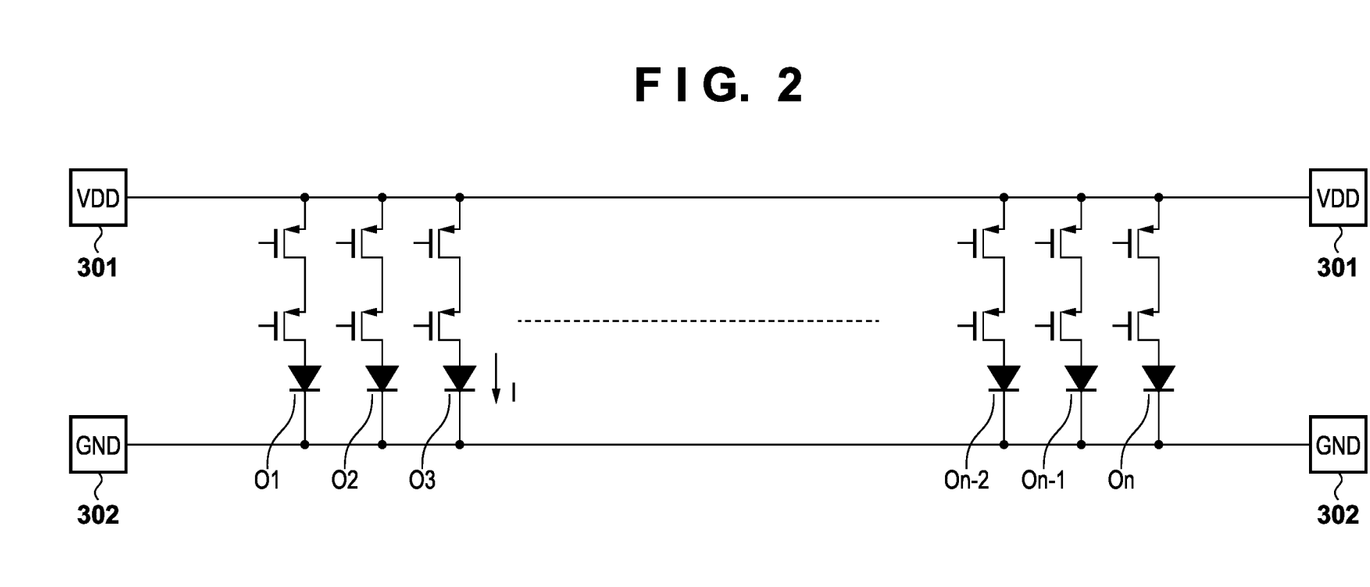
FIG. 2 is an explanatory view of a pixel drive circuit.

Driving of the light-emitting element will be explained by an example of a pixel drive circuit of FIG. 2. Light-emitting elements are denoted by O1 to On, and within the light-emitting device, a large number of the light-emitting elements share power source lines 301, 302.

Thus, when a voltage drop is generated in the middle of wiring of the power source lines 301, 302, and even when luminance signals from the current DAC 102 and from the current source circuit 104 are equal, there is a concern that a drive current amount changes in accordance with positions of connection points on the power source lines 301, 302. Consequently, light emission quantity of the light-emitting elements O1 to On varies, and there is a concern that light quantity unevenness occurs and image quality deteriorates. In particular, in a case where an OLED is used as a light-emitting element, since the OLED is a device of a current driving type, light emission quantity is likely to be affected by fluctuation in current.

Figure 3:
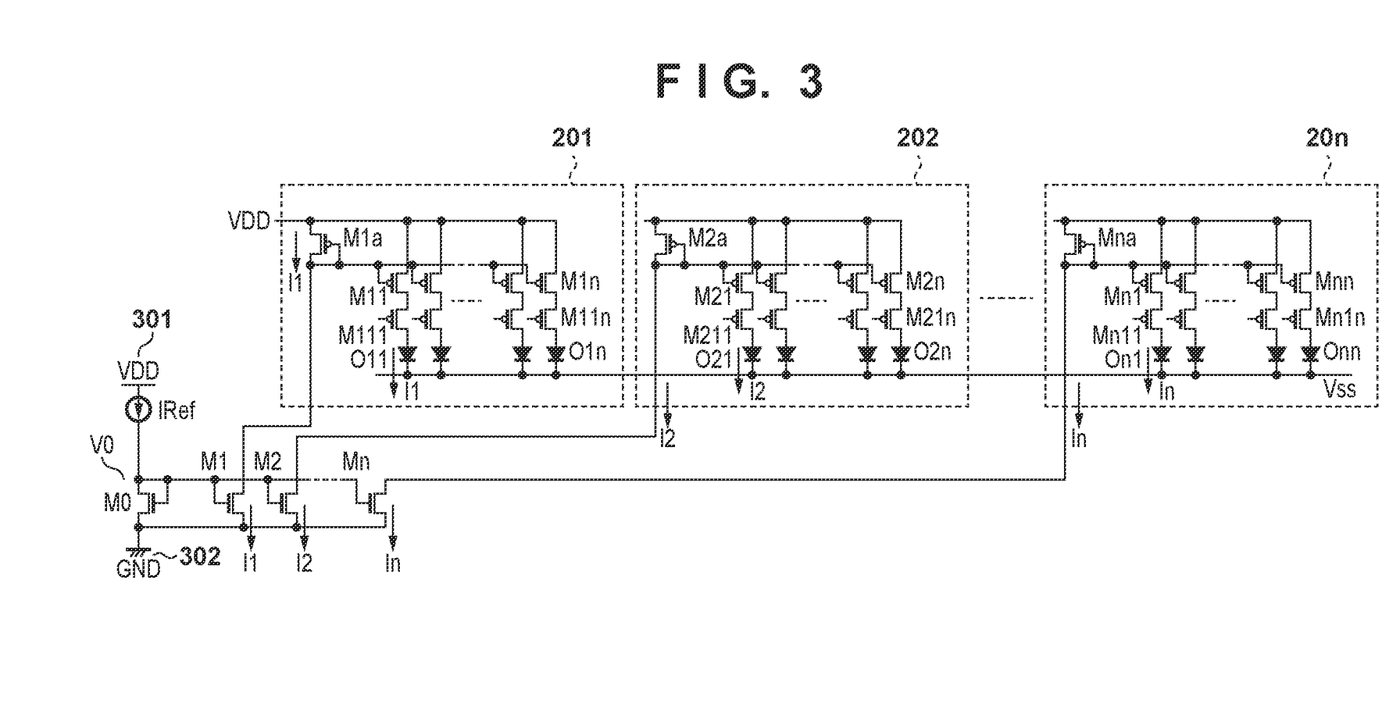
FIG. 3 illustrates an example of a pixel drive circuit.

Thus, in the present embodiment, a configuration as illustrated in FIG. 3 of a pixel drive circuit that is less likely to be affected by fluctuation in a power source line is adopted. A reference voltage source V0 constitutes a current mirror circuit together with a constant current source IRef and a transistor M0 that are connected in series, and together with the transistor M0 and transistors M1 to Mn. The transistors M1 to Mn are connected in series with transistors M1a to Mna, respectively. The transistor M1a, light-emitting elements O11 to O1n, transistors M11 to M1n, and transistors M111 to M11n are included in one group 201. Here, similar groups 201 to 20n are illustrated. Note that in this example, a current mirror ratio of the current mirror circuit is assumed to be 1 for explanation.

As described below, a collection of these groups 201 to 20n becomes the pixel drive circuit 105 including the OLED element. A circuit included in a group will be explained by taking the group 201 as an example. Reference current I1 that is common current flows through the transistor M1 and the transistor M1a connected in series with the transistor M1. Since the transistor M1a and the transistors M11 to M1n constitute a current mirror circuit, the current I1 that is common current flows. Accordingly, the current I1 that is common current can flow through the light-emitting elements O11 to O1n.

The reference voltage source V0 generates reference voltage predefined by the constant current source IRef, and voltage based upon the reference voltage is commonly applied to gates of the transistors M11 to M1n. In addition, voltage supplied from the data holding circuit 106 is applied to gates of the transistors M111 to M11n, and light emission of the light-emitting elements O11 to O1n are controlled by the transistors M111 to M11n. In this manner, the light-emitting elements O11 to O1n are driven by the transistors M11 to M1n and the transistors M111 to M11n and emit light.

Similarly, light-emitting elements O21 to O2n are driven by transistors M21 to M2n and transistors M211 to M21n and emit light, and light-emitting elements On1 to Onn are driven by transistors Mn1 to Mnn and transistors Mn11 to Mn1n and emit light. In this example, the transistor M0 and the transistors M1 to Mn are arranged in the vicinity to a predetermined region of a semiconductor substrate to constitute a current mirror circuit, and the transistors M1a to Mna through which current common to current flowing through the transistors M1 to Mn flows are arranged in the groups 201 to 20n, respectively. Accordingly, the light-emitting element is less likely to be affected by fluctuation in the power source line.

Similarly, the transistor M2a, the light-emitting elements O21 to O2n, the transistors M21 to M2n, and the transistors M211 to M21n are assumed to be included in the group 202. Within the light-emitting device, there are the groups 201 to 20n corresponding to the number of the transistors M1 to Mn. The groups are controlled respectively by the transistors M1 to Mn arranged corresponding to the groups, and by the transistors M1a to Mna of the groups that are connected in series with the transistors M1 to Mn. Through the transistors M11 to M1n of the group 201, the current I1 equal to current flowing through the transistors M1, M1a flows. In the group 201, the light-emitting elements O11 to O1n within the group are driven in accordance with driving by the transistors M111 to M11n. Similarly, current I2 that is common current flows through the transistor M2a of the group 202 that is connected to the transistor M2. Accordingly, a current amount equal to a current amount of the current I2 flowing through the transistor M2a flows through the transistors M21 to M2n.

A deviation in a current value among the groups can be suppressed by the arrangement of the current source as explained above. Thus, a structure that is less likely to be affected by a current path length is made. However, ideally, a current value of current flowing through the groups 201 to 20n is equal (I1=I2= . . . In), but actually, due to relative variation in the transistors M1 to Mn, the current value of current flowing through the groups 201 to 20n changes. When the current value of current flowing through the groups 201 to 20n is different, and light emission quantity is different among the groups, light quantity unevenness occurs among the groups. Light quantity unevenness appears, for instance, as density unevenness in a printing result of an image forming apparatus using a light-emitting element, and decreases image quality.

In addition, it is said that when density unevenness due to light quantity unevenness appears by a consecutive width of about 1 mm, visibility of the density unevenness becomes the highest. As an example, in a case where a length of a row of light-emitting elements of a light-emitting device is 19 mm, and there are 19 groups of the light-emitting elements within the light-emitting device, each interval of the groups becomes 1 mm. In a case where such a light-emitting device is used in a print head, there is possibility that image quality be affected. Therefore, an arrangement example of a light-emitting element that can further reduce visibility of generated light quantity unevenness will be explained below under the configuration illustrated in FIG. 3.

Figure 4A:
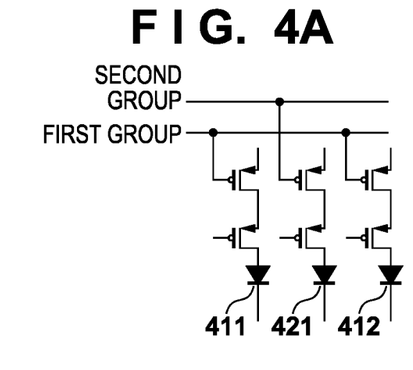
FIGS. 4A to 4E illustrate arrangement examples of a light-emitting element.
Figure 4B:
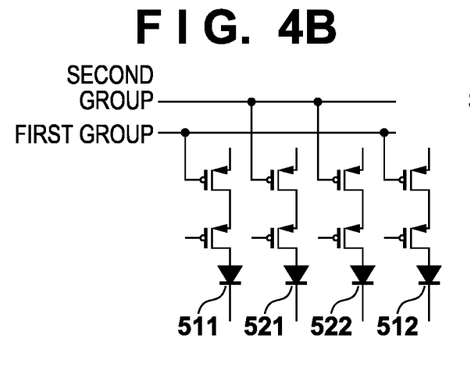
Figure 4C:
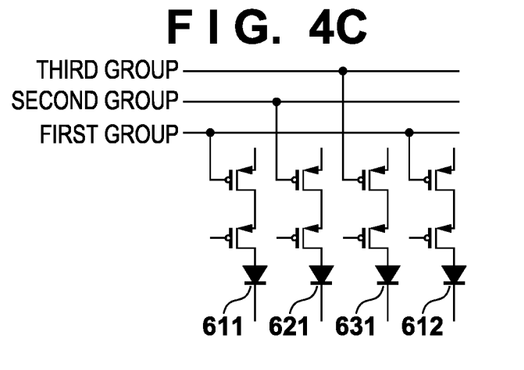

FIGS. 4A to 4E illustrate arrangement examples of a light-emitting element according to the present embodiment. In FIG. 4A, a light-emitting element 421 included in a second group different from a first group is sandwiched between two light-emitting elements 411, 412 included in the first group. As illustrated in FIG. 4B, two light-emitting elements 521, 522 included in a second group different from a first group may be arranged between two light-emitting elements 511, 512 included in the first group. As illustrated in FIG. 4C, a light-emitting element 621 included in a second group different from a first group and a light-emitting element 631 included in a third group different from the first group and the second group may be arranged between two light-emitting elements 611, 612 included in the first group.

Figure 4D:
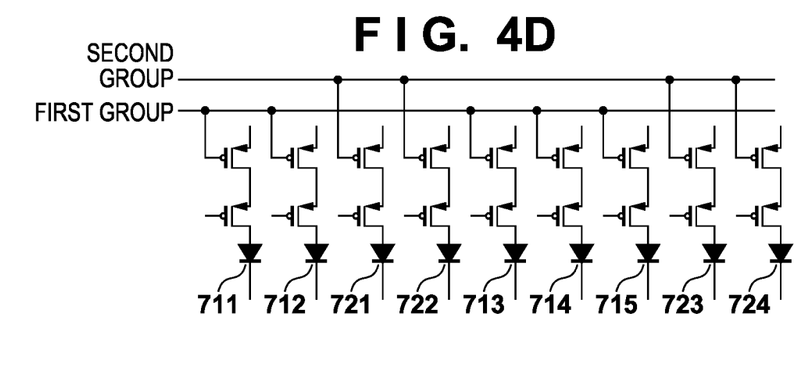
Figure 4E:
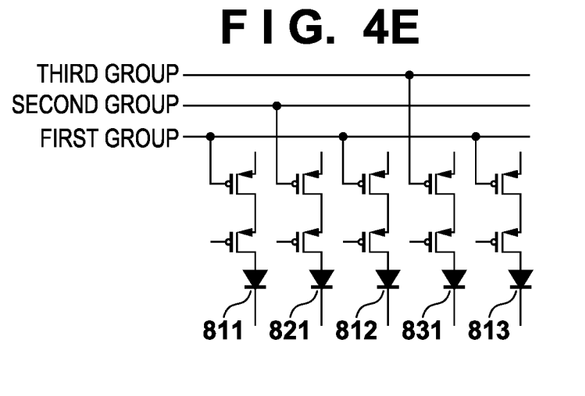

As illustrated in FIG. 4D, two light-emitting elements 721, 722 included in a second group different from a first group may be arranged between two light-emitting elements 711 and 712 and three light-emitting elements 713, 714, and 715 included in the first group. FIG. 4E illustrates an arrangement example of light-emitting elements included in three groups. A light-emitting element 821 included in a second group different from a first group is arranged between two light-emitting elements 811 and 812 included in the first group.

Then, a light-emitting element 831 included in a third group different from the first group and the second group is arranged between two light-emitting elements 812 and 813 included in the first group.

The arrangement pattern of the light-emitting elements is not limited thereto, and the light-emitting elements included in an arbitrary group different from the first group may be arranged between two light-emitting elements included in the first group such that visibility of light quantity unevenness within a chip is reduced. The light-emitting elements arrayed in a line shape within the light-emitting device are arranged in this manner, and thus even when light quantity unevenness occurs in the light-emitting elements, the light quantity unevenness within the light-emitting device is discretized as compared with the case where the light-emitting elements are arranged sequentially in order of groups. Thus, visibility of density unevenness in an image to be formed due to light quantity unevenness among the groups within the light-emitting device can be reduced.

Figure 5A:
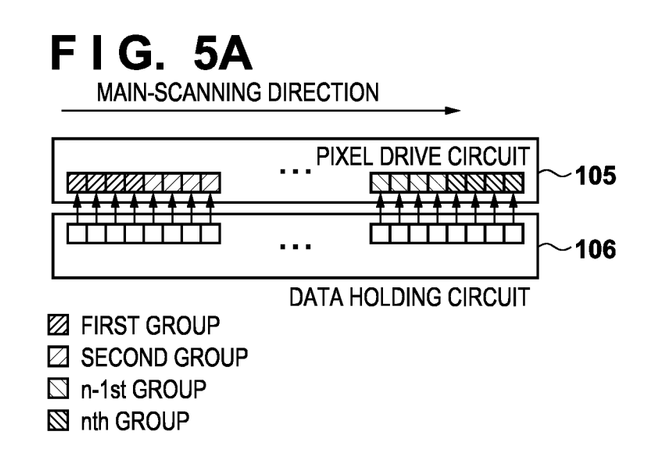
FIGS. 5A to 5D illustrate comparative examples of arrangement of a light-emitting element.
Figure 5B:
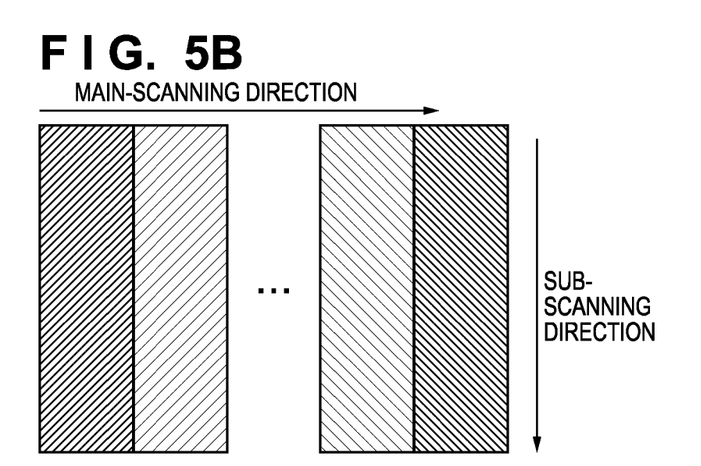

FIGS. 5A to 5D illustrate comparative examples regarding visibility of density unevenness. FIG. 5A illustrates an example where a plurality of light-emitting elements are arranged sequentially in order of groups. Light emitting elements included in the different groups arranged sequentially in a line shape such as a first group, a second group and the like are arranged side by side in a line shape. FIG. 5B illustrates an image example when light quantity unevenness occurs in a case where a print head is constituted by the arrangement of the light-emitting elements of FIG. 5A. When a current value of current flowing through each of the groups is different and light emission quantity of the light-emitting elements is different, density unevenness by a group unit occurs in a main-scanning direction as illustrated in FIG. 5B, and the density unevenness in the main-scanning direction also directly appears in a sub-scanning direction.

Figure 5C:
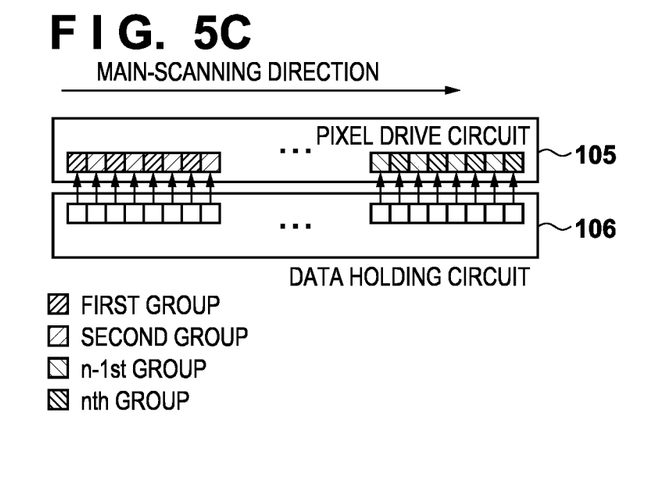
Figure 5D:
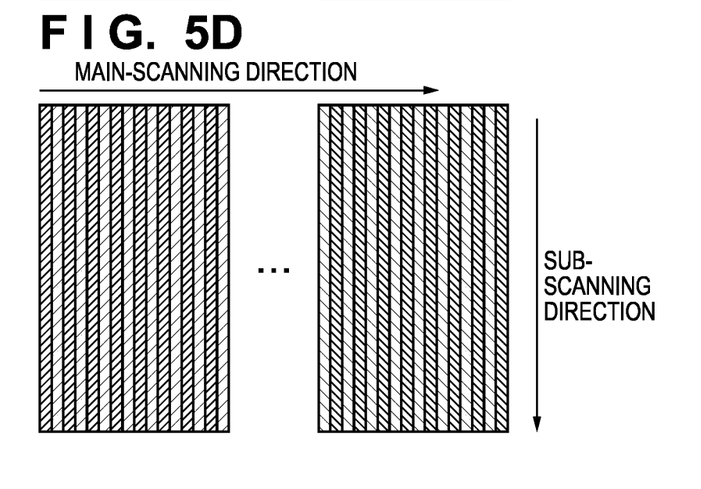

FIG. 5C illustrates an example where a light-emitting element included in a second group different from a first group is arranged between two light-emitting elements included in the first group. FIG. 5D illustrates an image example at that time. In this manner, the light-emitting element included in the second group different from the first group is arranged between the two light-emitting elements included in the first group. Accordingly, even when light emission quantity of the light-emitting elements is different due to a different current value of current flowing through each of the groups, each boundary of the groups in an image to be formed becomes difficult to be visually perceptible, and visibility of density unevenness can be reduced. According to such arrangement, visibility of density unevenness in an image to be formed due to light quantity unevenness within the light-emitting device can be decreased without increasing circuit scale for light quantity adjustment.

Figure 6:
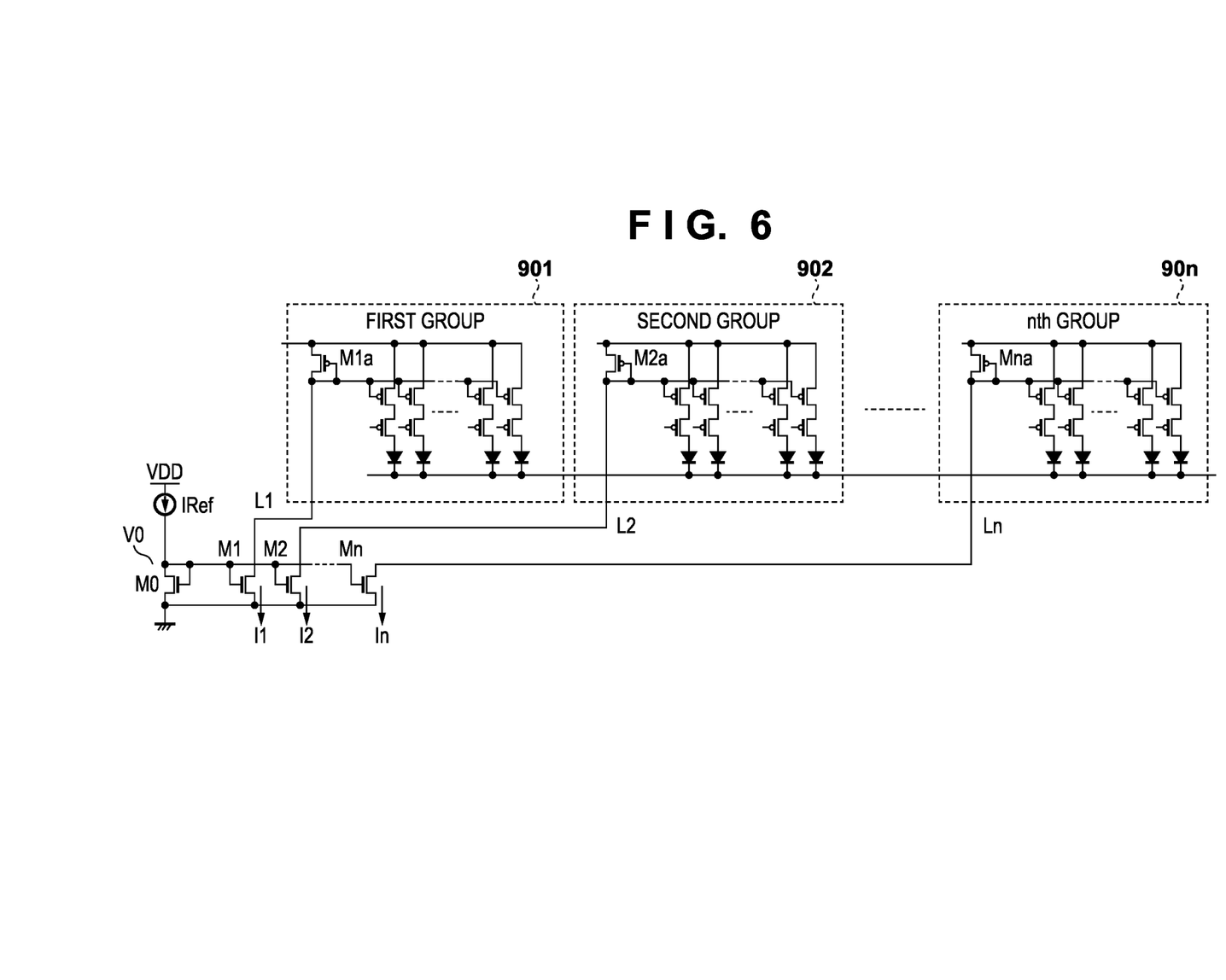
FIG. 6 illustrates an example of a pixel drive circuit.

Next, arrangement of groups will further be explained. FIG. 6 illustrates an example of electrical wiring of a pixel drive circuit. A transistor M0 and transistors M1 to Mn are arranged in the vicinity to a predetermined region of a semiconductor substrate in which a light-emitting device is formed. The transistor M0 constitutes a current mirror circuit together with the transistors M1 to Mn. The transistor M0 is a reference control transistor that controls current flowing through the transistors M1 to Mn. Replica current of current flowing through the transistor M0 flows through the transistors M1 to Mn. The transistors M1 to Mn are main control transistors that supply reference current to respective groups of light-emitting elements to control current flowing through the respective groups. The transistors M1a to Mna are group control transistors that control current flowing through the respective groups. Current paths that connect the group control transistors M1a to Mna and the main control transistors M1 to Mn, respectively are assumed to be current paths L1 to Ln. Sequentially from a group coupled to a shorter current path among the current paths L1 to Ln, the groups are assumed to be a first group, a second group, a third group, and an n-th group. The first group is a group that is closest to a place where the transistor M0 and the transistors M1 to Mn are arranged.

In FIG. 6, a group coupled to the transistors M1, M1a and the current path L1 is assumed to be a first group 901.

Similarly, a group coupled to the transistors M2, M2a and the current path L2 is assumed to be a second group 902. A group coupled to the current path L3 is assumed to be a third group 903, and a group coupled to the current path Ln is assumed to be an n-th group 90n.

Figure 7:
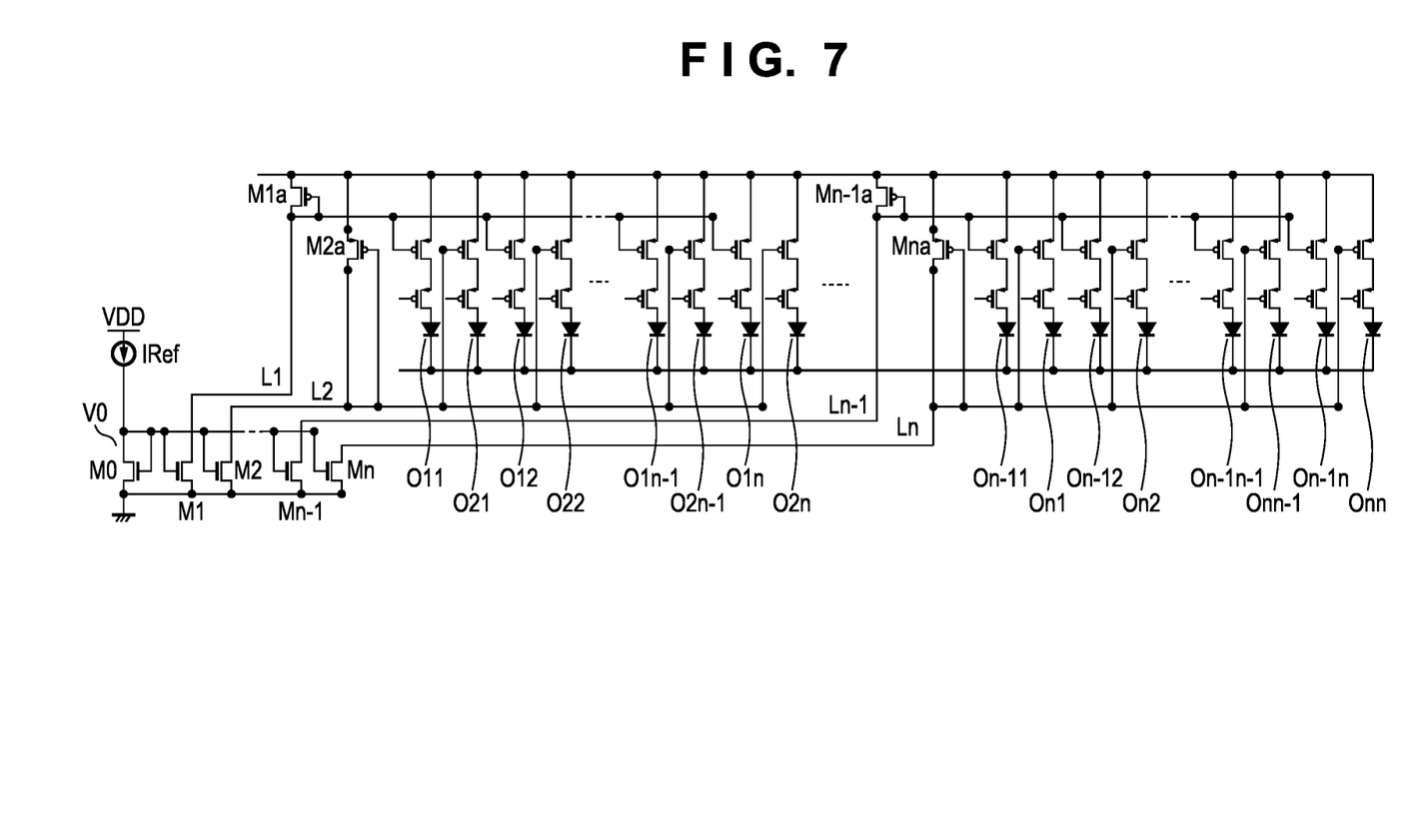
FIG. 7 illustrates an arrangement example of a light-emitting element.

FIG. 7 illustrates an arrangement example of light-emitting elements under the electrical circuit configuration of FIG. 6. Light-emitting elements O11 to O1n are light-emitting elements included in the first group 901, light-emitting elements O21 to O2n are light-emitting elements included in the second group 902, and light-emitting elements On1 to Onn are light-emitting elements included in the n-th group 90n. A light-emitting element of the second group 902 is arranged between two light-emitting elements included in the first group 901, and a light-emitting element of a fourth group 904 is arranged between two light-emitting elements included in the third group 903. This relationship continues, and finally, a light-emitting element of the n-th group 90n is arranged between two light-emitting elements included in an n−1th group 90n−1.

In this manner, sequentially from a group coupled to a current path that is closer to the main control transistors M1 to Mn among the current paths L1 to Ln from the main control transistors M1 to Mn to the respective groups, the groups are assumed to be the first group, the second group, the third group, . . . the n-th group. A light-emitting element included in the second group different from the first group is arranged in a manner that the light-emitting element included in the second group is adjacent to two light-emitting elements included in the first group. In other words, in this example, n groups from the first group to the n-th group are arranged in a line shape. In this case, a light-emitting element of a k+1th group is arranged between one light-emitting element of a k-th group among the n groups (k is an integer of from 1 to n−1, and n is an integer of 2 or greater) and the other light-emitting element of the k-th group. According to such arrangement, routing of wiring on the semiconductor substrate becomes easy, and the size of the light-emitting device can be reduced. Similarly, in this example, light quantity unevenness can be discretized, and visibility of density unevenness in an image to be formed due to the light quantity unevenness can also be decreased.

Further, an example where a plurality of rows of light-emitting elements are arranged side by side will be explained below. Here, a direction in which the light-emitting elements constituting a line shape are arranged side by side in a row is assumed to be the main-scanning direction, and a direction perpendicular to the main-scanning direction is assumed to be the sub-scanning direction.

Figure 8A:
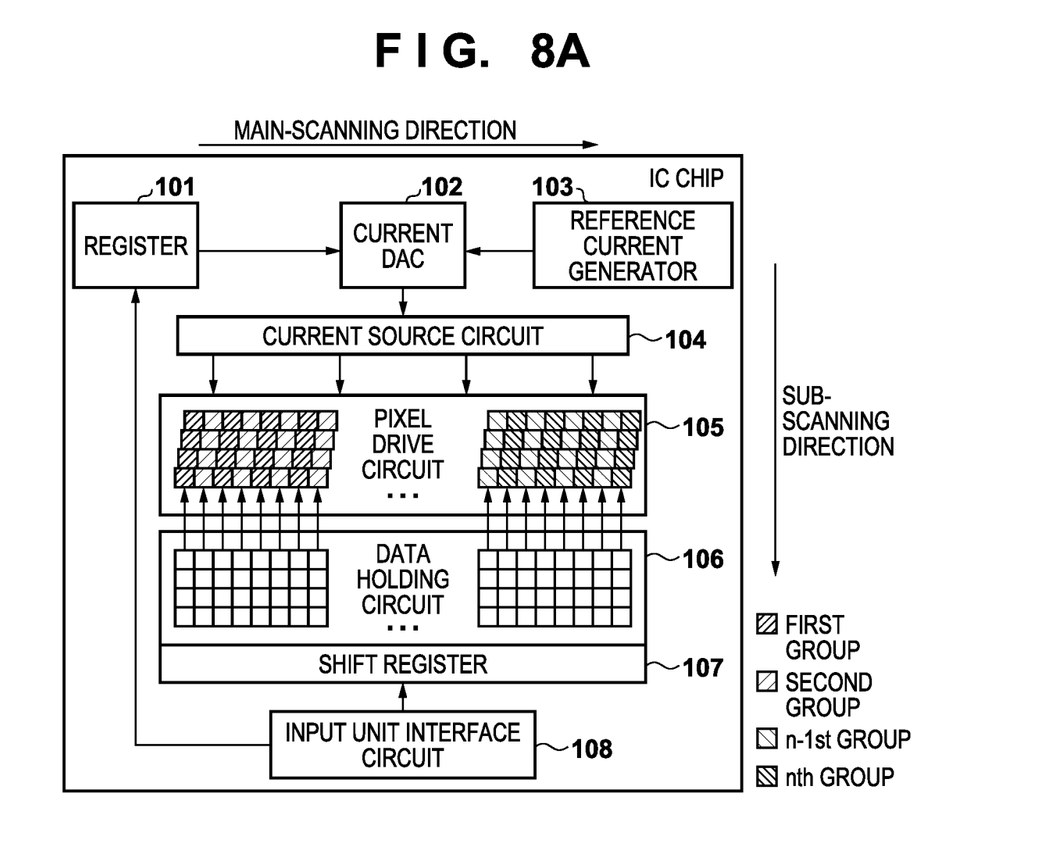
FIGS. 8A and 8B illustrate arrangement examples of a light-emitting element.
Figure 8B:
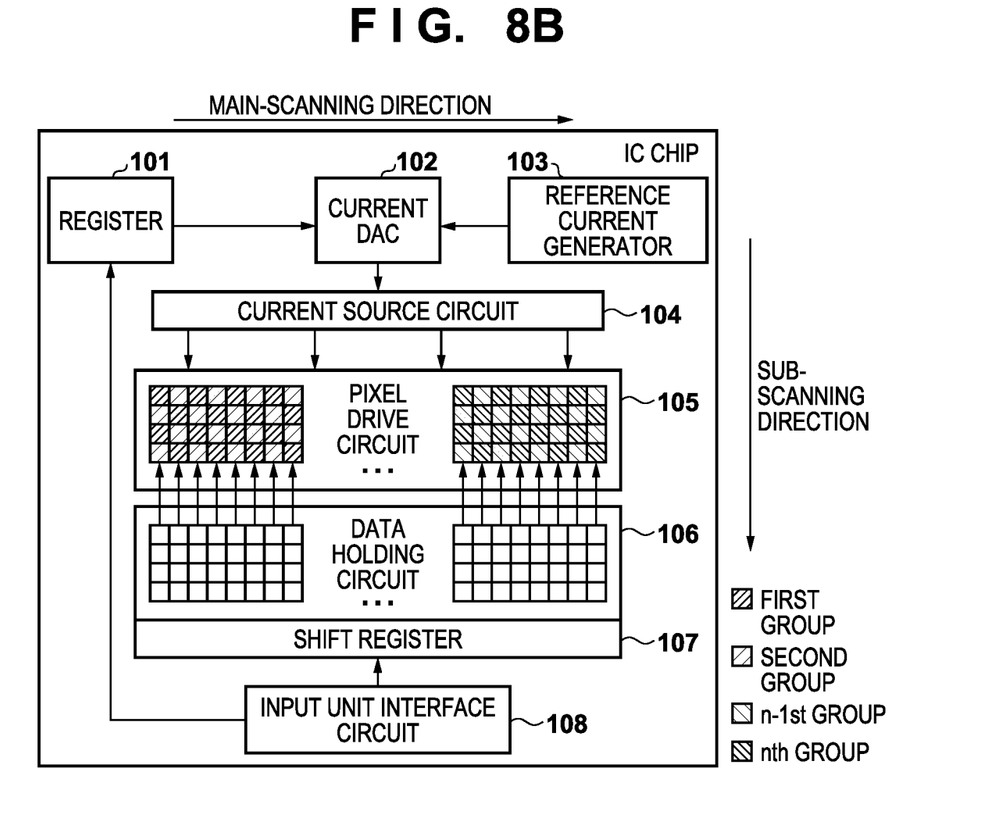

FIG. 8 is an example where the plurality of light-emitting elements explained above are arrayed such that the light-emitting elements constitute a row in a line shape in the main-scanning direction, and a plurality of rows of the light-emitting elements are arranged in the sub-scanning direction perpendicular to the main-scanning direction. The plurality of rows of light-emitting elements are arranged in the sub-scanning direction, and thus in a case where an exposure target of the print head moves in the sub-scanning direction, multiple exposure can be performed by controlling light emission/non-light emission of each of the light-emitting element rows in accordance with a moving distance corresponding to a row interval. For instance, in the case of a configuration of four rows in the sub-scanning direction, five-tone exposure amount control including non-light emission can be performed only by two-value control of light emission/non-light emission of the light-emitting elements in each of the rows.

FIG. 8A illustrates an example where in each of the light-emitting element rows in the sub-scanning direction, as with in the main scanning direction, a light-emitting element included in the second group different from the first group is arranged between two light-emitting elements included in the first group.

In this example, there is made a configuration where a plurality of rows of the light-emitting element lines constituting a line shape are arranged in the sub-scanning direction, and the arrangement of the light-emitting elements in the sub-scanning direction is shifted for each of the rows and between light-emitting elements of a different group by a distance equal to or less than the size of the light-emitting element. Accordingly, in the multiple exposure described above, more complex exposure tone control can be performed by a combination of selection of light emission/non-light emission of the light-emitting elements in the rows.

In addition, in this example, as with the embodiment described above, the configuration where a light-emitting element of the second group is arranged between light-emitting elements of the first group is applied to the group selection of the light-emitting elements in a line of the plurality of rows, and the configuration where a control group can be selected in the light-emitting elements arranged in the sub-scanning direction is adopted.

The selection and arrangement of the group in the sub-scanning direction are not limited to the above, and may be optimized in terms of reduction of visibility of light quantity unevenness.

FIG. 8B is an example where a light-emitting element included in a second group different from a first group is two-dimensionally arranged in a manner that the light-emitting element included in the second group is adjacent to two light-emitting elements included in the first group in the sub-scanning direction. In this example, light-emitting elements of different groups are arranged to form a lattice pattern.

In this manner, similarly, in light-emitting element rows that are two-dimensionally arrayed, a light-emitting element included in the second group different from the first group is arranged between two light-emitting elements included in the first group, and thus visibility of density unevenness can be decreased.

In addition, the groups constituting the respective rows of the plurality of rows may each have a control current source. More specifically, the first group and the second group may be arranged in a first row, a third group and a fourth group may be arranged in a second row, and a fifth group and a sixth group may be arranged in a third row. Similarly, in this case, in the arrangement of the light-emitting elements, the light-emitting elements in the first row and the light-emitting elements in the second row may be arranged being shifted by a distance equal to or less than the size of the light-emitting element, and the light-emitting elements in the second row and the light-emitting elements in the third row may also be arranged being shifted by a distance equal to or less than the size of the light-emitting element. According to such arrangement, visibility of density unevenness in an image to be formed due to light quantity unevenness by variation in the control current source in the sub-scanning direction can be reduced.

Figure 9A:
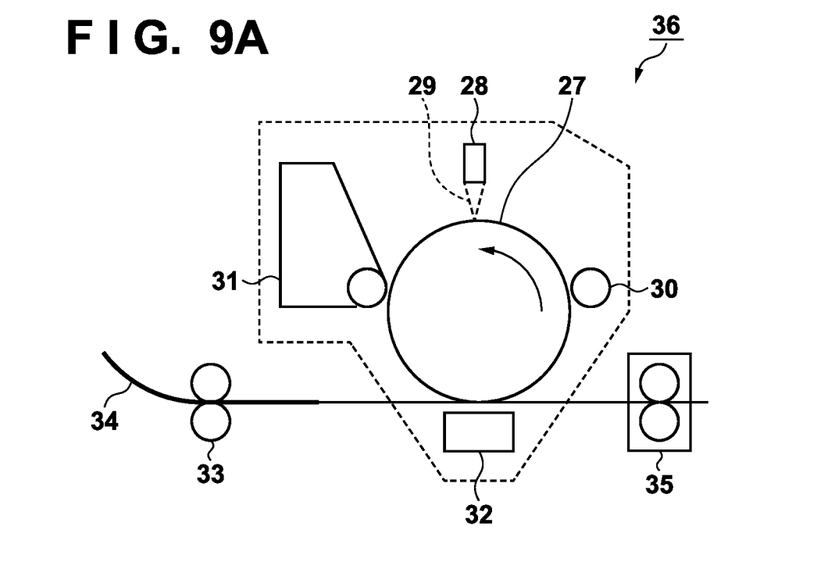
FIGS. 9A to 9C illustrate examples of an image forming apparatus.

FIG. 9A is a schematic view of an image forming apparatus 36 according to an embodiment of the present invention. The image forming apparatus has a photoconductor 27, an exposure light source 28, a development unit 31, a charging unit 30, a transfer unit 32, a conveyance unit 33, and a fixing unit 35.

Irradiation with light 29 from the exposure light source 28 is performed, and an electrostatic latent image is formed in a surface of the photoconductor 27. The light-emitting device according to the present embodiment is applied as this exposure light source. The development unit 31 has a toner or the like. The charging unit 30 charges the photoconductor 27. The transfer unit 32 transfers a developed image to a recording medium 34. The conveyance unit 33 conveys the recording medium 34. The recording medium 34 is, for instance, paper. The fixing unit 35 fixes an image formed in the recording medium.

Figure 9B:
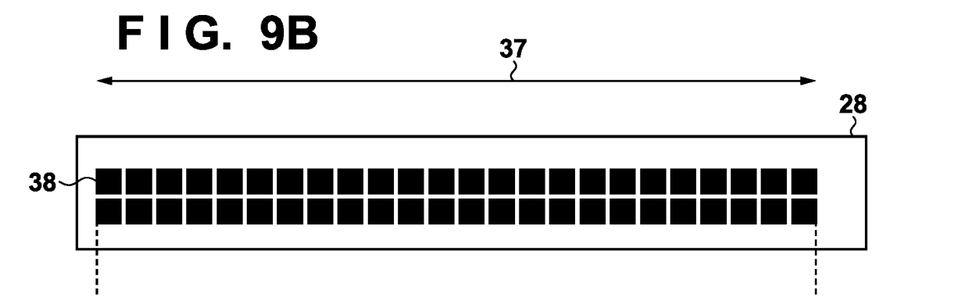
Figure 9C:
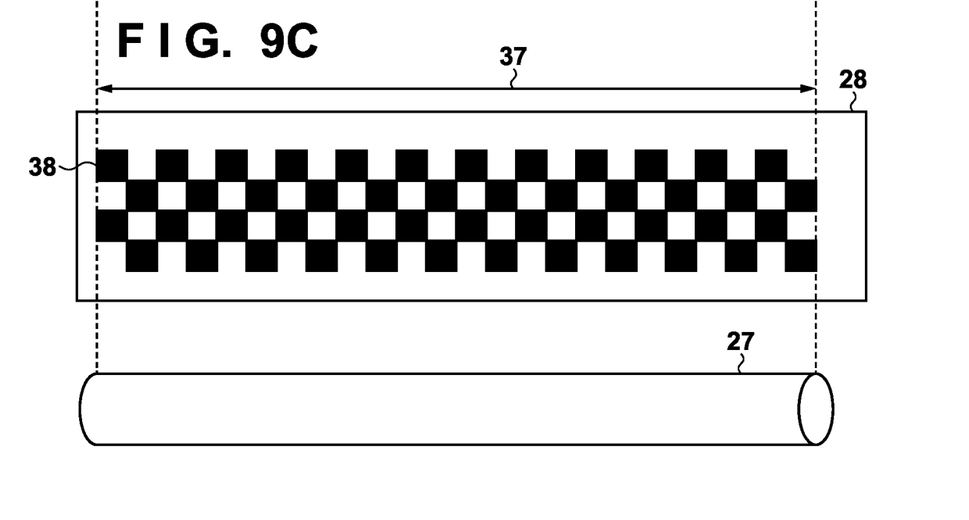

FIGS. 9B and 9C are schematic diagrams illustrating a state where a plurality of light-emitting devices 38 are arranged in the exposure light source 28. A line 37 indicates a direction parallel to an axis of the photoconductor and represents a direction in which the light-emitting elements are arrayed. This direction is equal to a direction of an axis around which the photoconductor 27 rotates. This direction can also be referred to as a major axis direction of the photoconductor 27. In this manner, the light-emitting elements are arranged along the major axis direction of the photoconductor 27.

FIG. 9C illustrates arrangement of the light-emitting devices 38 that is different from the arrangement of FIG. 9B. In this example, four rows of the light-emitting devices are arranged in a direction (row direction) perpendicular to the major axis direction.

The light-emitting devices 38 are arranged to sequentially constitute a first row, a second row, a third row, and a fourth row. In each of the first row and the second row, light-emitting units are alternately arranged in a row direction. That is, the light-emitting devices 38 in the first row and the light-emitting devices 38 in the second row are arranged at positions different in the row direction.

In the first row, the plurality of light-emitting devices 38 are arranged at an interval. In the second row, a light-emitting device is arranged at a position corresponding to a position between the light-emitting devices 38 arranged side by side in the first row. That is, the plurality of light-emitting units are also arranged at an interval in the row direction.

In other words, the arrangement of FIG. 9C can also be said to be, for example, arrangement of a lattice shape, or arrangement of houndstooth check, or a checkerboard pattern.

According to the present invention, a light-emitting device that provides reduced influence of light quantity unevenness can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-067243, filed, Apr. 12, 2021 which is hereby incorporated by reference herein in its entirety.

What is claimed is:

1. A light-emitting device in which a plurality of groups are arranged, each of the groups comprising:
   a plurality of light-emitting elements;
   a plurality of transistors arranged corresponding to the plurality of light-emitting elements, respectively and configured to supply current to the plurality of light-emitting elements, respectively; and
   a group control transistor configured to control current flowing through the plurality of transistors, wherein
   the plurality of groups comprise a first group and a second group,
   the first group comprises a first group control transistor, a plurality of transistors of the first group through which a first current amount flowing through the first group control transistor flows, and a plurality of light-emitting elements,
   the second group comprises a second group control transistor, a plurality of transistors of the second group through which a second current amount flowing through the second group control transistor flows, and a plurality of light-emitting elements, and
   a light-emitting element of the second group is arranged between one light-emitting element of the first group and the other light-emitting element of the first group.

2. A light-emitting device comprising:
   a plurality of groups each comprising a plurality of light-emitting elements and a group control transistor connected to the plurality of light-emitting elements; and
   a plurality of main control transistors arranged corresponding to the plurality of groups, respectively, wherein
   the plurality of groups comprise a first group and a second group,
   a first current amount flowing through a main control transistor arranged corresponding to the first group flows through a group control transistor of the first group, and a second current amount flowing through a main control transistor arranged corresponding to the second group flows through a group control transistor of the second group, and
   a light-emitting element of the second group is arranged between one light-emitting element of the first group and the other light-emitting element of the first group.

3. The light-emitting device according to claim 2 comprising
   a transistor configured to control light emission of the corresponding light-emitting element of the plurality of light-emitting elements of the first group, between the group control transistor of the first group and each of the plurality of light-emitting elements of the first group, and
   a transistor configured to control light emission of the corresponding light-emitting element of the plurality of light-emitting elements of the second group, between the group control transistor of the second group and each of the plurality of light-emitting elements of the second group.

4. The light-emitting device according to claim 2 further comprising a reference control transistor configured to control current flowing through the plurality of main control transistors.

5. The light-emitting device according to claim 2, wherein
   the plurality of groups comprise n (n is an integer of 2 or greater) groups, and a first group to an n-th group are arranged side by side along the row direction sequentially from a group coupled to a shorter current path between the group control transistor of each of the plurality of groups and the main control transistor configured to supply current to the group control transistor, and
   one light-emitting element of a k+1-th (k is an integer of from 1 to n−1) group is arranged between one light-emitting element of a k-th group and the other light-emitting element of the k-th group.

6. The light-emitting device according to claim 1, wherein
the first group and the second group constitute a first row, a second row, and a third row,
the second row and the third row are arranged side by side in a direction perpendicular to the first row, and
one light-emitting element of the first group in the second row is arranged between one light-emitting element of the second group in the first row and one light-emitting element of the second group in the third row.

7. The light-emitting device according to claim 1, wherein
the plurality of groups comprise a fourth group, a fifth group, a sixth group, and a seventh group,
the first group and the second group are arranged to constitute a first row, the fourth group and the fifth group are arranged to constitute a second row, and the sixth group and the seventh group are arranged to constitute a third row,
the second row and the third row are arranged side by side with the first row in a direction perpendicular to the first row, and
one light-emitting element of the fifth group in the second row is arranged between one light-emitting element of the first group in the first row and one light-emitting element of the sixth group in the third row.

8. The light-emitting device according to claim 1, wherein
the plurality of groups further comprises a third group, and
a light-emitting element of the second group is arranged between the one light-emitting element of the first group and one light-emitting element of the third group.

9. The light-emitting device according to claim 1, wherein the light-emitting element is an organic light-emitting element.

10. An image forming apparatus comprising:
a photoconductor; and
an exposure light source configured to expose the photoconductor to light, wherein
the exposure light source comprises the light-emitting device according to claim 1.

* * * * *